(12) United States Patent
Prokop et al.

(10) Patent No.: US 7,463,619 B1
(45) Date of Patent: Dec. 9, 2008

(54) LAUNCHING A WEB BROWSER IN RESPONSE TO A MESSAGE RELATING TO COMMUNICATIONS SESSIONS

(75) Inventors: Andrew J. Prokop, St. Paul, MN (US); Michael E. Gilleland, St. Paul, MN (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 09/578,627

(22) Filed: May 25, 2000

(51) Int. Cl.
*H04L 12/66* (2006.01)
*G06F 15/16* (2006.01)

(52) U.S. Cl. .............. 370/352; 370/235; 370/389; 709/228; 455/557; 704/270.1

(58) Field of Classification Search ........... 370/230, 370/235, 236, 352, 356, 389, 392, 465, 469; 709/102, 203, 207, 218, 228, 231, 232, 227, 709/270.1; 455/413, 557, 414, 445, 414.1; 704/201, 270.1; 379/93.07
See application file for complete search history.

(56) References Cited

U.S. PATENT DOCUMENTS

| | | | |
|---|---|---|---|
| 6,122,364 A | | 9/2000 | Petrunka et al. |
| 6,154,646 A * | | 11/2000 | Tran et al. ................ 455/417 |
| 6,496,500 B2 * | | 12/2002 | Johnson et al. ............. 370/352 |
| 6,539,538 B1 * | | 3/2003 | Brewster et al. ............ 717/115 |
| 6,614,899 B1 * | | 9/2003 | Sollee et al. ............ 379/218.01 |
| 6,631,186 B1 * | | 10/2003 | Adams et al. ............ 379/201.12 |
| 6,678,718 B1 * | | 1/2004 | Khouri et al. ............. 709/204 |
| 6,681,395 B1 * | | 1/2004 | Nishi ........................ 725/45 |
| 6,757,732 B1 * | | 6/2004 | Sollee et al. ................ 709/227 |
| 6,785,266 B2 * | | 8/2004 | Swartz ....................... 370/352 |
| 6,831,915 B1 * | | 12/2004 | Beyschlag et al. .......... 370/352 |
| 6,909,708 B1 * | | 6/2005 | Krishnaswamy et al. ..... 370/352 |

OTHER PUBLICATIONS

Steve Donovan, et al., *The SIP Info Method*, Internet Draft, pp. 1-7 (Jun. 1999).
Steve Donovan, *The SIP Info Method*, Internet Draft, pp. 1-10 (Feb. 2000).
Jon Crowcroft, *Comments About H.323 and SIP*, pp. 1-6, printed from web site http://www.cs.columbia.edu (Jan. 22, 1998).

(Continued)

*Primary Examiner*—Afsar Qureshi
(74) *Attorney, Agent, or Firm*—Trop, Pruner & Hu, P.C.

(57) ABSTRACT

A communications system includes a network coupled to various network elements. The network elements include user systems that contain protocol-aware applications that are aware of the protocol used to establish streaming-type communications (e.g., audio, video, or multimedia) or text-based communications over the network. The protocol used for such communications may include the Session Initiation Protocol (SIP), H.323, or other protocols. Each of the user systems includes a rules engine that is capable of collecting information from a SIP message and comparing the information to criteria or rules that have been entered by a user. When a match occurs, one or more target applications or other software routines are launched to perform predetermined tasks. The launched applications or other software routines may include a web browser, for example.

34 Claims, 8 Drawing Sheets

OTHER PUBLICATIONS

*Comparison of H.323 and SIP*, pp. 1-5, printed from web site http://www.cs.columbia.edu, dated at least as early as Feb. 3, 2000.

Information Sciences Institute, *Internet Protocol, DARPA Internet Program Protocol Specification*, RFC 791, pp. 1-48 (Sep. 1981).

J. Postel, *User Datagram Protocol*, RFC 768, pp. 1-3 (Aug. 1980).

M. Handley, et al., *SDP: Session Description Protocol*, RFC 2327, pp. 1-39 (Apr. 1998).

H. Schulzrinne, et al., *RTP: A Transport Protocol for Real-Time Applications*, RFC 1889, pp. 1-69 (Jan. 1996).

S. Deering, et al., *Internet Protocol, Version 6 (IPv6) Specification*, RFC 2460, pp. 1-36 (Dec. 1998).

M. Handley, et al., *SIP: Session Initiation Protocol*, RFC 2543, pp. 1-153 (Mar. 1999).

Adam Roach, *Event Notification in SIP*, Internet Draft, pp. 1-8 (Mar. 2000).

Scott Petrack, et al., *The Pint Service Protocol: Extensions to SIP and SDP for IP Access to Telephone Call Services*, Internet Draft, pp. 1-59 (Oct. 14, 1999).

Jiri Kuthan, *Samples Uses of SIP Info With Varying Reliability Needs*, Internet Draft, pp. 1-7 (Oct. 17, 1999).

Robert Sparks, et al., *SIP Telephony Service Examples With Call Flows*, Internet Draft, pp. 1-79 (Oct. 1999).

HTML 4.01 Specification, W3C Recommendation, Chs. 2, 12, 16 and 13 (Dec. 24, 1999).

Rosenberg et al., *Programming Internet Telephony Services*, IEEE Network Magazine, May, 1999, pp. 42-49.

Kristensen et al., *The SIP Servlet API*, IETF—Internet Draft, Sep., 1999, pp. 1-26.

* cited by examiner

```
                                                            ┌─400
  OUTGOING MESSAGE to 47.105.195.50: 5060
  INVITE sip:meg@47.105.196.50:5060 SIP/2.0
  To: sip:meg@47.105.196.50:5060
  From: sip:ajp@47.105.196.51:5060 ;tag=1791582439
  Call-ID: 3791441467857381@47.105.196.51
  CSeq: 11 INVITE
  Via: SIP/2.0/UDP 47.105.196.51:5060
  Priority: normal
  Subject: Subject field
  Organization: Nortel Networks
  Content-Type: application/sdp
  Content-Length: 251
  v=0
  o=ajp 4060929 4060929 IN Ip4 47.105.196.51
  s=nortelnetworks
  p=+1 972 684 1000 (Nortelnetworks Richardson, Texas)
  c=IN IP4 47.105.196.51
  t=0 0
  m=audio 9000 RTP/AVP 0 3 4
  a=rtpmap:0 pcmu/8000/1
  a=rtpmap:3 gsm/8000/1
  a=rtpmap:4 g723/8000/1
```

FIG. 7

```
callRule = new CallRule();
callRule.setMessageType(SipBase.SIP_INVT);

callRule.addHeaderConstraint(new HeaderConstraint ("Priority" , "Normal"));
callRule.addHeaderConstraint(new HeaderConstraint ("Organization", "NortelNetworks");
callRule.setDirection(CallRule.INCOMING);
callRule.addHeaderConstraint(new HeaderConstraint ("From", "aprokop@nortelnetworks.com"));

callRule.setUserDefinedData("www.nortelnetworks.com");

callRule.setClassToInstantiate("com.nortelnetworks.sippro.exampleApp");
```

- 500
- 502 — CallRule = new CallRule();
- 504 — callRule.setMessageType(SipBase.SIP_INVT);
- 506 — (header constraint block)
- 508 — callRule.setUserDefinedData(...)
- 510 — callRule.setClassToInstantiate(...)

FIG. 9

LAUNCHING A WEB BROWSER IN RESPONSE TO A MESSAGE RELATING TO COMMUNICATIONS SESSIONS

BACKGROUND

The invention relates to launching software routines in response to messages relating to communications sessions.

Packet-based data networks are widely used to link various types of network elements, such as personal computers, servers, gateways, network telephones, and so forth. Data networks may include private networks (such as local area networks or wide area networks) and public networks (such as the Internet). Popular forms of communications between network elements across packet-based data networks include electronic mail, file transfer, web browsing, and other exchanges of digital data.

With the increased capacity and reliability of packet-based data networks, voice communications (including telephone calls, video conferencing, and so forth) over data networks have become possible. Voice communications over data networks are unlike voice communications in a conventional public-switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data sent over a data network typically shares network bandwidth with conventional non-voice data (e.g., data associated with electronic mail, file transfer, web access, and other traffic).

Various standards have been proposed for voice and multimedia communications over data networks. One such standard is the H.323 Recommendation from the International Telecommunications Union (ITU), which describes terminals, equipment, and services for multimedia communications over data networks. Another standard for voice and multimedia communications is the Session Initiation Protocol (SIP), which establishes, maintains, and terminates multimedia sessions over a data network. SIP is part of multimedia data and control architecture developed by the Internet Engineering Task Force (IETF). The IETF multimedia data and control architecture also includes other protocols to enable voice and multimedia sessions over data networks.

Although the ability to participate in audio as well as other streaming-type communications over packet-based networks has increased flexibility in how users can communicate, additional features may be desirable. The types of user systems that are available for audio or other streaming-type communications over packet-based networks include network telephones and computer systems that are fitted with audio and video processing capabilities, as examples. In a computer system, the user may be presented with a graphical user interface (GUI) screen in which the user can make selections to make an outgoing call or receive an incoming call. Information identifying the user and relating to the established call session may also be presented in the GUI screen.

Although such features enhance user convenience in establishing and participating in call sessions over a packet-based network, a need continues to exist for additional features that are made available to users in communications sessions over networks.

SUMMARY

In general, according to one embodiment, a method for use in a system having a network includes receiving a control message for a call session over the network and comparing information in the control message against one or more predetermined criteria. A software routine is launched based on the comparison of the control message information with the one or more predetermined criteria.

Some embodiments of the invention may include one or more of the following advantages. By having the ability to launch one or more routines in a system in response to a control message such as a call request, interaction with various applications or other components that may be resident in the system is made available as part of a call session. For example, in response to a call request, the call may be answered and in addition, a browser or other software routine may be launched to show information concerning the remote calling or called party. If the site being called is a customer service department of a business, for example, the information displayed in the browser page may relate to prior business transactions of a customer. This gives the agent answering the call convenient access to information about the customer during the call session. Other examples in which other application routines may be launched for enhanced flexibility and convenience may also be possible in further embodiments.

Other features and advantages will become apparent from the following description, from the drawings, and from the claims.

BRIEF DESCRIPTION OF THE DRAWINGS

FIG. 7 illustrates a message for making an outgoing call in accordance with an embodiment.

FIG. 9 illustrates code creating a call rules object in accordance with an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the Session Initiation Protocol (SIP) in the described embodiments, other embodiments may employ other types of standards or protocols for communications over packet-based networks.

Figure 1:
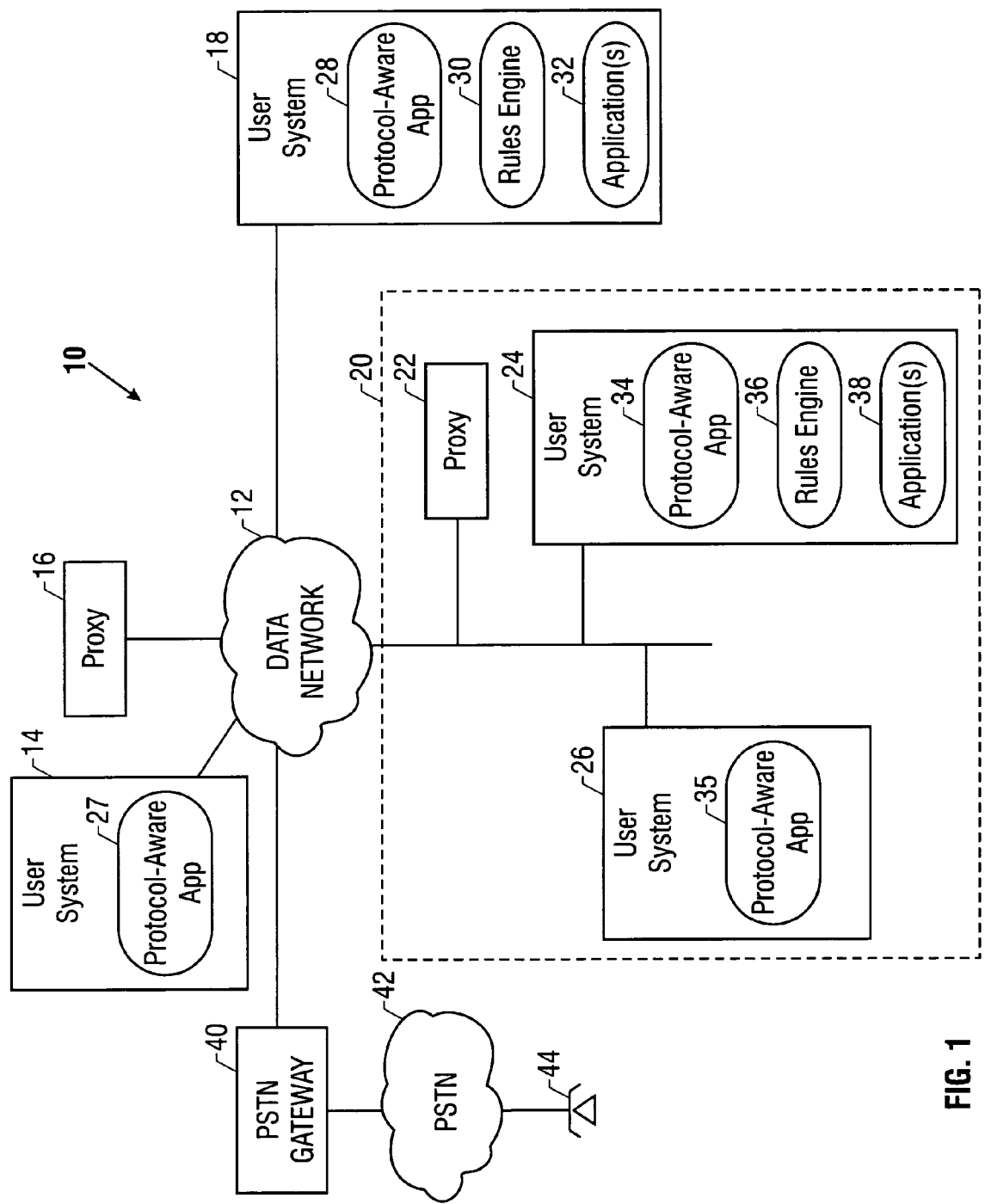
FIG. 1 is a block diagram of an embodiment of a communications system that includes a packet-based network.

Referring to FIG. 1, a communications system 10 includes a packet-based data network 12 and various network elements. The network elements may include user systems 14, 18, 24, and 26 as well as proxies 16 and 22 that are capable of making calls on behalf of other network elements, such as the user systems 14, 18 and 24.

The user systems 24 and 26 and the proxy 22 may be part of a community 20. As used here, a "community" may refer to any collection of systems that may be grouped together. For example, the community 20 may include an enterprise, such as a corporation or other organization. User systems within the community 20 may be computer systems and the like. The user systems 14, 18, 24, and 26 are capable of participating in communications of streaming data (e.g., audio or video data) over the data network 12 according to a predetermined protocol. To perform such communications, each of the user systems 14, 18, 24 and 26 may include a "protocol-aware" application 27, 28, 34 or 35, respectively.

In accordance with some embodiments of the invention, some or all of the user systems in the communications system 10 are capable of launching various software routines, such as application routines 32 (in the user system 18) and application routines 38 (in the user system 24), in response to requests (inbound or outbound) to establish call sessions over the data network 12. Software routines may also be launched in response to other control messages relating to a call session, such as messages indicating the status of the call session (e.g., ringing, trying, acknowledged, etc.). In the user systems 18 and 24, respective rule engines 30 and 36 are able to compare information contained in protocol messages (used for initiating call sessions) against a predetermined set of rules or criteria. Based on such comparison, the rules engine 30 or 36 launches an appropriate one or more of the application routines 32 and 38 in respective user systems 18 and 24. Such application routines 32 and 38 may include web browsers or other types of applications. The application routines 32 and 38 do not need to be aware of the protocol that is used for establishing call sessions between end stations over the data network 12.

The applications 32 and 38 are separate from the call control and status routines (which may be part of the protocol-aware applications 28 and 34) as well as media-related routines that control the communication of inbound or outbound media data (text, audio, video, etc.). Call control routines control the generation of appropriate messages and actions in response to various inputs or outputs as well as presents selectors for user selection. Call status routines may present information pertaining to an established call session, including identity information, status of a call session, and other related information. Media-related routines include routines that process, route, and present communicated media data, including text, audio, video, or a combination of the above. The target applications 28 and 34 or other software routines that are launched in response to a match of user-entered rules are independent of such call control and status routines and media-related routines. They are launched to provide services in addition to call control, call status, and media communication services.

As a result of this capability to launch applications in user systems, flexibility and added features are provided to a user. For example, in response to an incoming or outgoing call, a web browser may be launched that contains information relating to the calling or called party. This enables presentation of information associated with the remote party while the call session is ongoing. Examples of other application routines that may be launched include any application that may present text, audio, and/or video messages to the called party. Another application may be one that is capable of accessing storage devices (local or remote) to retrieve information for use in a call session. In addition, software layers besides application routines may be launched, including drivers and other modules to perform various predetermined tasks.

As used here, a "data network" or "network" may refer to one or more communications networks, channels, links, or paths, and systems or devices (such as routers) used to route data over such networks, channels, links, or paths. Packet-based data networks communicate with packets, datagrams, or other units of data over the data networks. Unlike circuit-switched networks, which provide a dedicated end-to-end connection or physical path for the duration of a call session, a packet-based network is one in which the same path may be shared by several network elements.

Packet-based networks may be packet-switched networks, such as Internet Protocol (IP) networks, which are based on a connectionless internetwork layer. Packets or other units of data transmitted into a packet-switched data network may travel independently over any path (and possibly over different paths) to a destination point. The packets may even arrive out of order. Routing of the packets is based on one or more addresses carried in each packet. Packet-based networks may also be connection-oriented networks, such as Asynchronous Transfer Mode (ATM) and Frame Relay networks. In a connection-oriented packet-based network, a virtual circuit or connection is established between two end points. In such connection-oriented networks, packets are received in the same order in which they were transmitted.

One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998.

One protocol that provides for establishment of streaming communications includes a Session Initiation Protocol (SIP). SIP is part of the multimedia data and control architecture from the Internet Engineering Task Force (IETF). A version of SIP is described in RFC 2543, entitled "SIP: Session Initiation Protocol," dated 1999. SIP may be used to initiate call sessions as well to invite members to a session that may have been advertised by some other mechanism, such as electronic mail, newsgroups, web pages, and other mechanisms. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327; and the Session Announcement Protocol (SAP), for advertising multimedia sessions.

Other standards may be employed in further embodiments for controlling call sessions over the data network 12. Such other standards may be any other standard that provides for interactive, real-time streaming communications over the data network 12. One alternate standard is the H.323 Recommendation from the International Telecommunication Union (ITU). As used here, a "call session" refers generally to either an audio (e.g., voice), a video, or a multimedia session established between two or more network elements (and parties using those elements) coupled to the data network 12 (or any other packet-based data network). A call session may also be a text-based chat session, such as an instant massaging session. As used here, an "interactive" call session refers to a call session in which two or more parties are involved in an exchange of voice and/or video data (or text data) in an established session between two or more network elements. A "real-time" interactive call session refers to an exchange of data, such as audio and/or video data (or text data), on a substantially real-time basis between two terminals. A session is substantially real time if interaction is occurring between two end points or parties, with a communication from one end point followed relatively quickly by a response or another communication from the other end point, typically within seconds, for example. A "call request" is a message (inbound or outbound) generated to establish a call session.

Interactive sessions are contrasted with electronic mail messaging, for example, in which a first participant sends a message over a data network to a second participant. No indication is usually provided back to the first participant that the second participant has received the message or that the second participant is even at his or her terminal. In contrast, an interactive session involves a request followed by some acknowledgment that a called party has accepted the call request. This enables the interactive session in which participants exchange data (e.g., voice, video, and/or text).

The user systems 14, 18, 24, and 26 in FIG. 1 may be SIP clients or SIP servers. A SIP client system includes a client application program that is capable of sending SIP requests to perform call requests. A SIP server system includes a server application program that accepts SIP requests to service calls and to send back responses to SIP requests. The user systems 14, 24, and 26 may be SIP client systems when making calls and SIP server systems when receiving calls. The systems 16 and 22 may be SIP proxy systems, each including an intermediary program that acts as both a server and a client for making requests on behalf of other clients. Thus, for example, the user system 18 may make a call request to the user system 24 directly through the data network 12. Alternatively, the user system 18 may go through the SIP proxy system 22 (and/or system 16) to make the call to the user system 24.

In addition, the communications system 10 includes a PSTN gateway 20 that provides a gateway between the data network 12 and a public switched telephone network (PSTN) 42, which is coupled to circuit-switched telephone systems 44. The PSTN gateway 40 may also include elements to enable it to participate in SIP call sessions over the data network 12. A caller at a telephone system 44 may place a circuit-switched call through the PSTN 42 to the PSTN gateway 40. The PSTN gateway 40 then converts the call into a SIP call request that is sent to one of the user systems to establish a call session between the telephone system 44 and the user system. The reverse process may also be performed in which a user system initiates a call through the PSTN gateway 40 to one of the telephone systems 44. Mobile telephones and other devices (not shown) may also make calls over the data network 12 through appropriate gateways (not shown).

Figure 2:
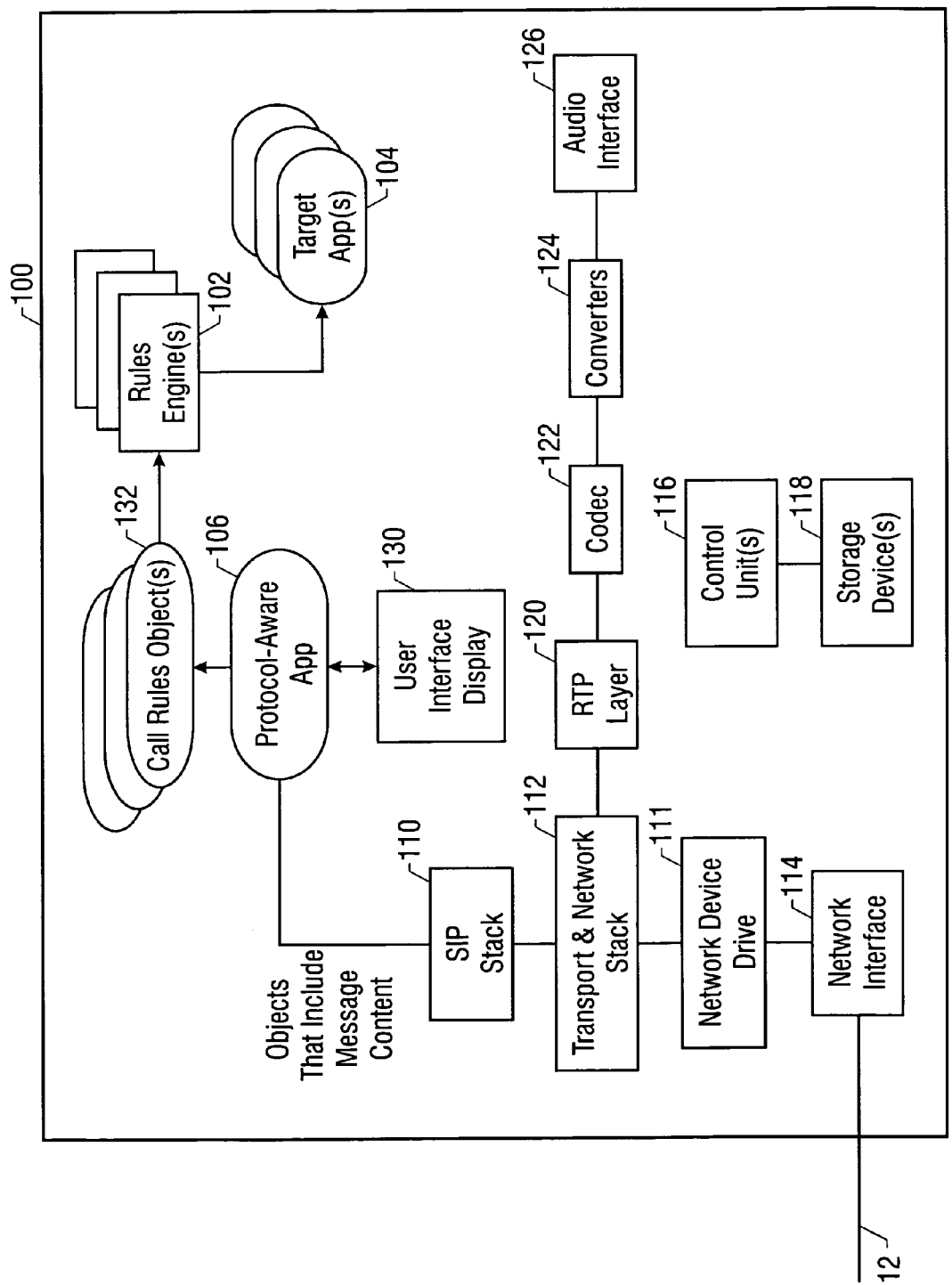
FIG. 2 is a block diagram of components of a network element capable of use with the packet-based network of FIG. 1.

Referring to FIG. 2, the components of an example user system 100 (such as user system 14, 18, 24, or 26) are illustrated. The user system 100 includes a network interface 114 that is coupled to the data network 12. The network interface 114 may include a network controller card or chip, as examples. Above the network interface 114 are a network device driver 111 and a transport and network stack 112 (e.g., a TCP/IP stack and/or a UDP/IP stack). TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network.

Above the transport and network stack 112 is a SIP stack 110 that parses and processes SIP messages (both inbound and outbound). The transport and network stack 112 also is connected to an RTP layer 120 that processes and generates real-time data frames (containing data associated with an audio call, for example). The RTP layer 120 may be connected to an audio coder/decoder (CODEC) 122, which is coupled to converters 124 (e.g., analog-to-digital and digital-to-analog converters). The converters 124 are coupled to an audio interface 126 that may in turn be coupled to a speaker, headphone, and/or microphone (not shown) for presenting and receiving audio signals.

The user system 100 may also include a protocol-aware application 106 (which in one embodiment is a SIP-aware application) that is coupled to receive control signaling from the SIP stack 110 or to provide control signaling to the SIP stack 110 for generation of SIP messages. The protocol-aware application 106 may be one of the applications 28 and 34 in FIG. 1. The SIP-aware application 106 can make decisions on how to process and respond to received SIP messages. For example, such SIP messages may be messages inviting the user system 100 to participate in a call session as well as various response messages indicating various stages of the progress of a call session setup. The protocol-aware application may also receive input from a user, such as through a user interface display 130. Based on the user input, the protocol-aware application 106 may send request or response messages through the SIP stack 110 to the data network 12 indicating initiation of a call, acceptance of a call request, or forwarding of the call to another device. Such tasks performed by the protocol-aware application 106 are examples of call control and status tasks.

The user interface display 130 may also include GUI screens in which a user can make and answer calls as well as enter rules or criteria that relate to the launching of various applications or other software routines in response to an incoming or outgoing call. The rules or criteria are passed to a call rules object 132, which contains various methods that can be called by the protocol-aware application 106. Multiple call rules objects 132 may be present to contain different sets of rules or criteria so that different applications or software routines may be launched. A call rules engine 102 is associated with each call rules object 132. In one implementation, the call rules engine 102 may be a function in the call rules object 132.

Figure 3:
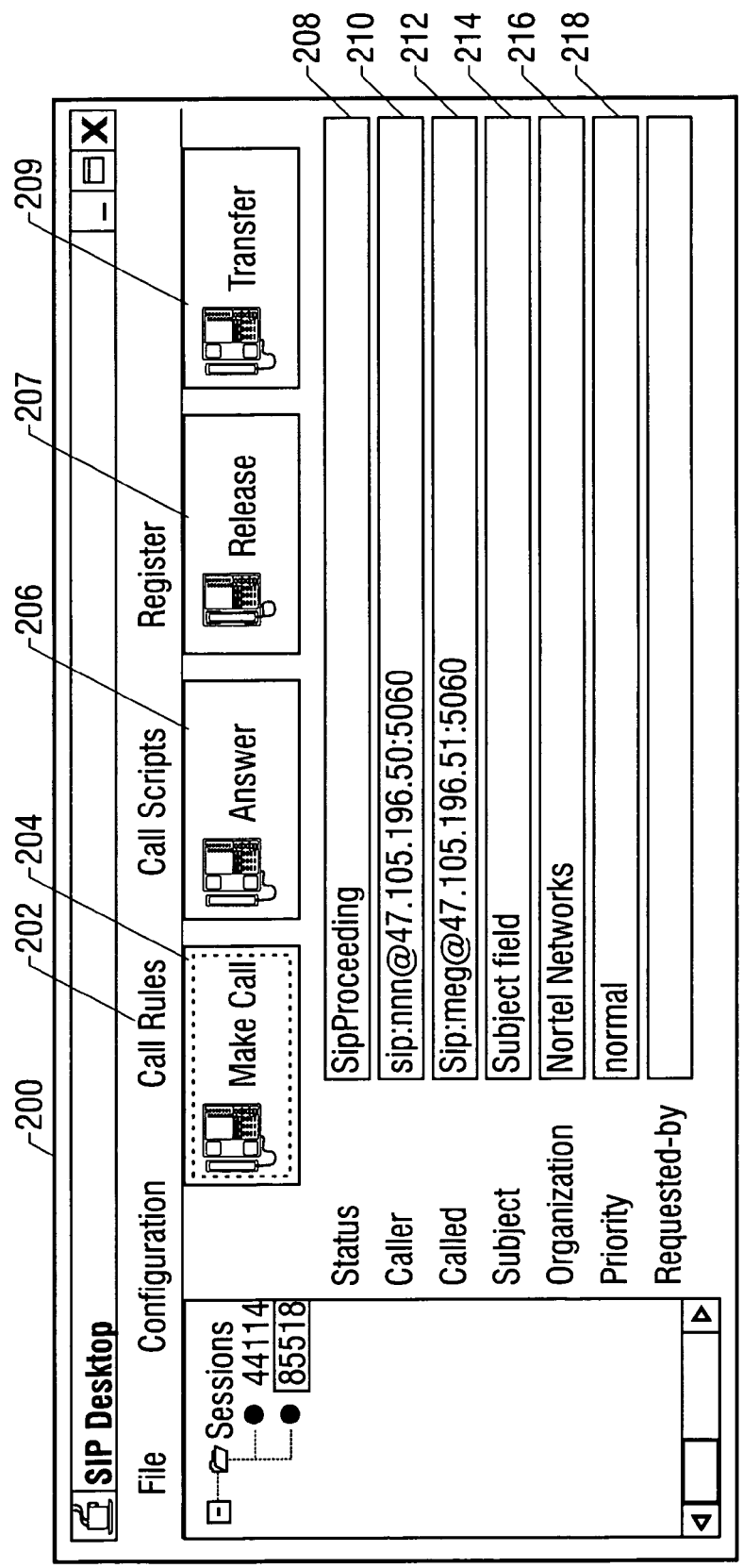
FIGS. 3–6 are graphical user interface (GUI) screens that may be presented by the network element of FIG. 2 in accordance with an embodiment.

Referring to FIG. 3, a SIP desktop GUI screen 200 that may be presented on the display 130 (FIG. 2) is illustrated. The SIP desktop screen 200 includes various icons, buttons, and other graphical elements that allow a user to control a call session. The organization of the SIP desktop screen 200 is illustrated as an example only. Other embodiments may include other arrangements of the screen 200.

In the screen 200, a "Make Call" button 204 allows the user to initiate a call session. An "Answer" button 206 enables the user to answer an incoming call. A "Release" button 207 allows the user to terminate a call session. A "Transfer" button 209 allows the user to transfer or redirect the call to another location or device. Other buttons may also be available in other embodiments.

The SIP desktop screen 200 also includes various fields that pertain to the status and parameters of a call session. For example, a status field 208 indicates the status of a current call session. The illustrated "SipProceeding" status indicates that a SIP call session is proceeding. The field 210 identifies the caller, while the field 212 identifies the called party. The subject field 214 may include a text message indicating the subject of the call session. The field 216 can identify the organization that the caller is associated with, and a field 218 identifies the priority of the call session. Other fields may also be present to convey additional information. The information in the various fields may be contained in a SIP Invite message.

In accordance with some embodiments, the SIP desktop 200 also includes a call rules menu 202 that is selectable by the user to enter various rules or criteria that are communicated to the rules engine 102 (FIG. 2) to allow launching of one or more target applications or other software routines 104. In another embodiment, the call rules menu 202 may be a button or some other GUI element.

Figure 4:
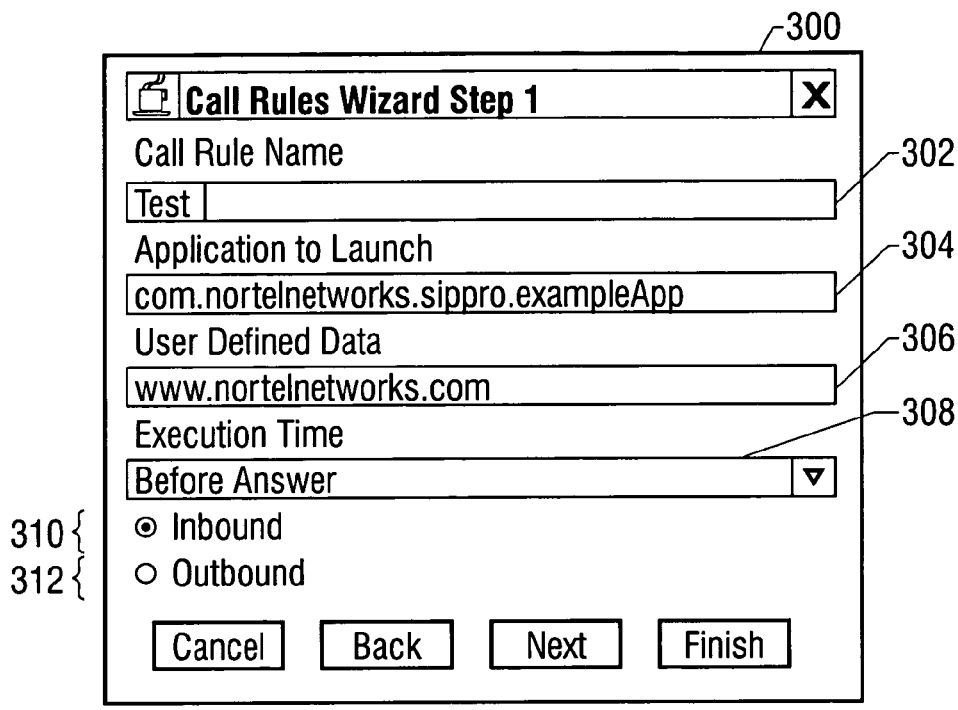
Figure 5:
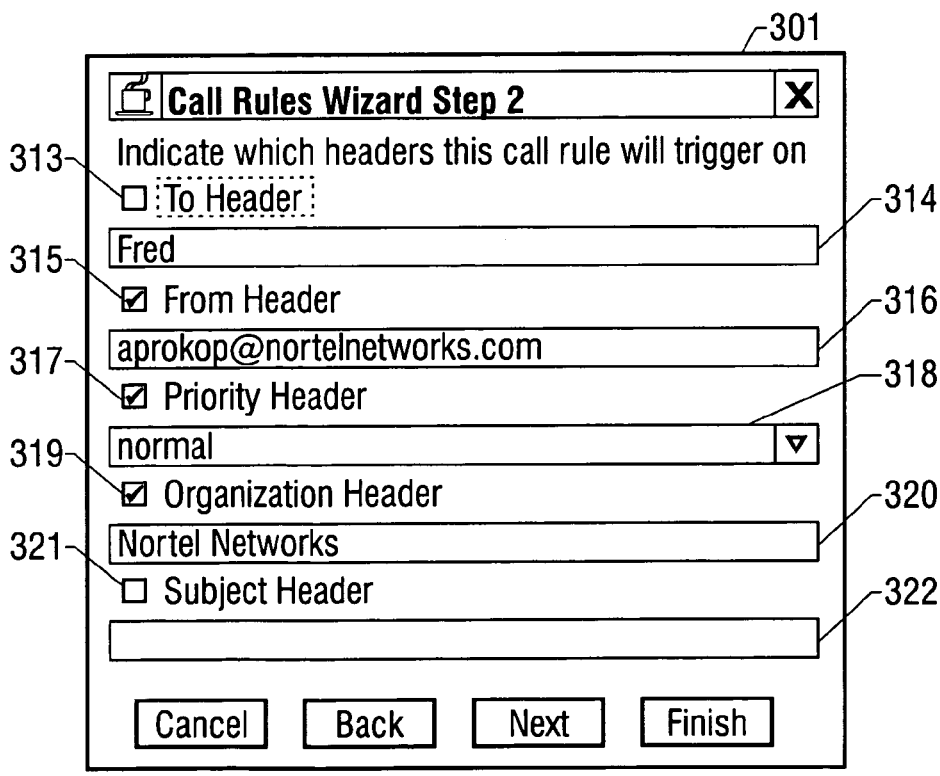
Figure 6:
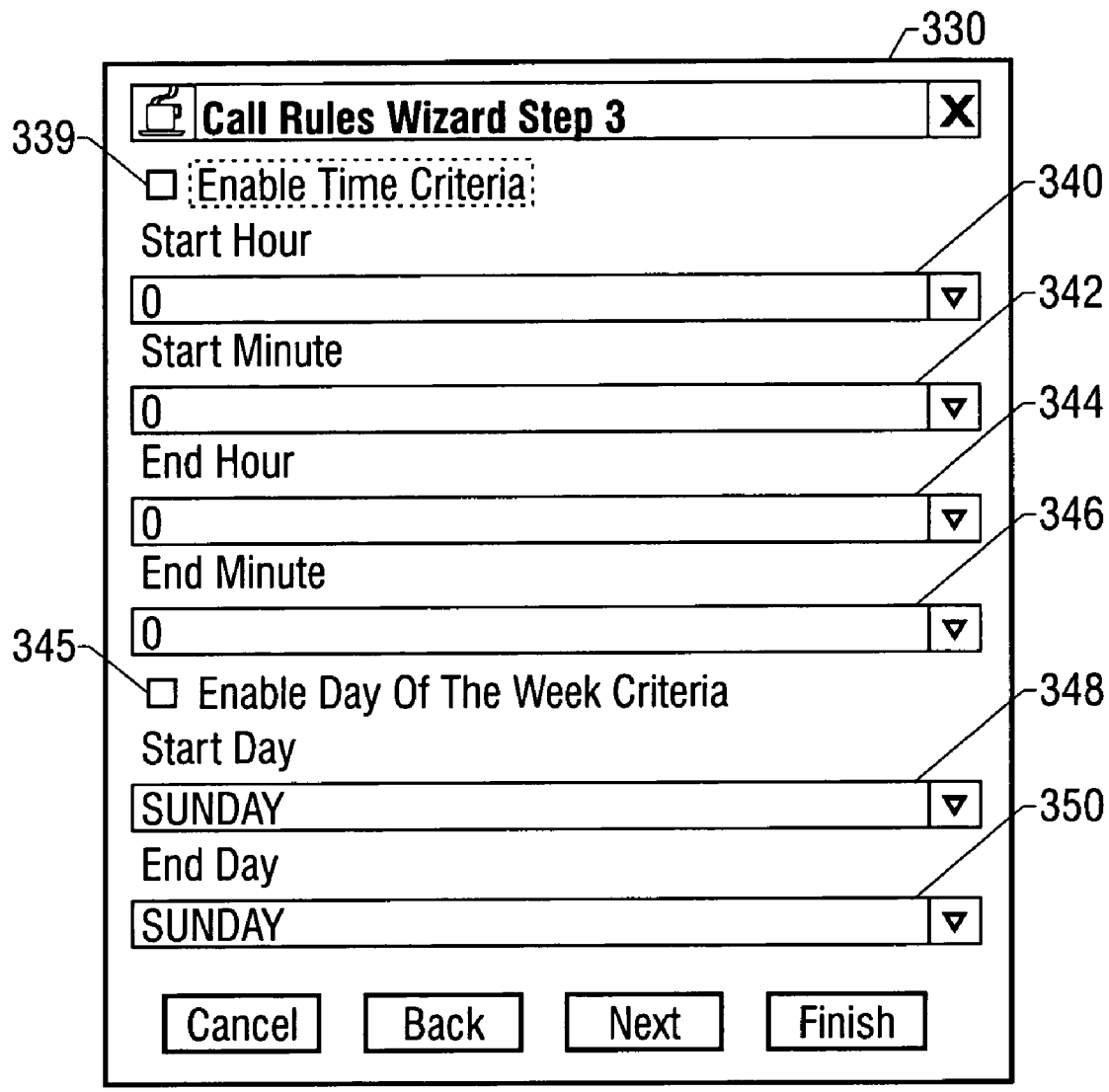

In one example embodiment, from the call rules menu 202 in the SIP desktop screen 200, various call rules screens may be launched. For example, a first call rules wizard screen 300, a second call rules wizard screen 301, and a third call rules wizard screen 330 are illustrated in FIGS. 4–6, respectively. The call rules wizard screens 300, 301, 330 are provided or example purposes as other embodiments may have other configurations and arrangements of the screens. In addition, in further embodiments, instead of using multiple screens, a single screen may be employed.

In the first call rules screen 300 shown in FIG. 4, various fields are provided. The name of the call rules set may be entered into a field 302. In the illustrated example, the name of the call rules set being created is "Test." Multiple sets of call rules may be created and stored for access by the rules engine 102. Each call rules set includes one or more criteria or rules that the rules engine 102 compares against information in an incoming or outgoing SIP control message.

The first call rules wizard screen 300 also includes a field 304 in which a target application may be entered. For example, the target application in FIG. 4 is com.nortelnetworks.sippro.exampleApp (which may be a browser, for example). If the one or more criteria under the call rules set Test match the content of an incoming or outgoing message, then the com.nortelnetworks.sippro.exampleApp application is launched. User defined data may be entered into a field 302 in the screen 300. The user-defined data is passed with the launching of the application. For example, if the application being launched is a web browser, then a web uniform resource locator (URL) such as "www.nortelnetworks.com" may be passed with the launching of the target application. Thus, the launched web browser opens the web page at the specified URL.

As further shown in FIG. 4, a field 308 indicates the time of execution, which may be before answer, upon answer, upon release, and so forth. In addition, a field 310 is selectable to indicate that the rules processing is to be performed for an inbound call, and a field 312 is selectable to indicate that the rules processing is to be performed for an outbound call.

Referring to FIG. 5, a second call rules wizard screen 301 allows a user to enter a portion of the rules or criteria. A first field 314 allows the user to enter information relating to the "To" entry of a SIP message, which specifies an address of a called entity. The field 316 contains information that is matched to the "From" entry of a SIP message, which specifies an address of a calling entity. The field 318 contains the priority information, the field 320 contains the organization information, and the field 322 contains the subject information. When respective activation boxes 313, 315, 317, 319 and 321 are selected by the user, the entered information in respective fields 314, 316, 318, 320 and 322 are communicated to the rules engine 102 for processing.

Referring to FIG. 6, further rules or criteria information may be entered into the third rules wizard screen 330. The rules wizard screen 330 allows entry of time and day criteria, which are enabled if an activation box 339 is selected by the user. For example, the field 340 indicates the start hour, the field 342 indicates the start minute, the field 344 indicates an end hour, and the field 346 indicates an end minute. In addition, an activation box 345 is selectable to enable criteria relating to days of the week. The field 348 allows entry of a start day and the field 350 indicates an end day. Although not shown, dates may also be entered in the call rules wizard screen 330.

In other embodiments, other types of call rules or criteria may be entered. As also noted above, the several screens 300, 301, and 330 may be combined into a single screen.

Referring to FIG. 7, an example SIP message 400 that may be employed in communications over the data network 12 between network elements is illustrated. The illustrated SIP message 400 includes portions of a SIP Invite request. The first line in the message 400 indicates that the message is part of an outgoing call. The second line includes the string "Invite" to indicate that the message 400 is an Invite request. Following that, the destination address ("To"), the source address ("From"), and call session identifier ("Call-ID") may be provided. A Cseq parameter provides a sequence number indicating the count of the message in the call session having the identifier Call-ID. The message may also include a Priority parameter to indicate the priority of the message, a Subject parameter that contains subject text, and an Organization parameter that identifies the organization that the caller is associated with. A Content-Type parameter may indicate the type of content that may be included in the message. In the illustrated message 400, the Content-Type parameter is "application/sdp," which indicates that the message body contains SDP information. The Content-Length parameter indicates the length of the content. Further information is provided in the example SIP message 400.

Some of the various parameters in the message 400 are extracted from the Invite message for display in the screen 200 (FIG. 3) as well as for comparison to rules entered into the rules wizard screen 301 (FIG. 5).

Figure 8:
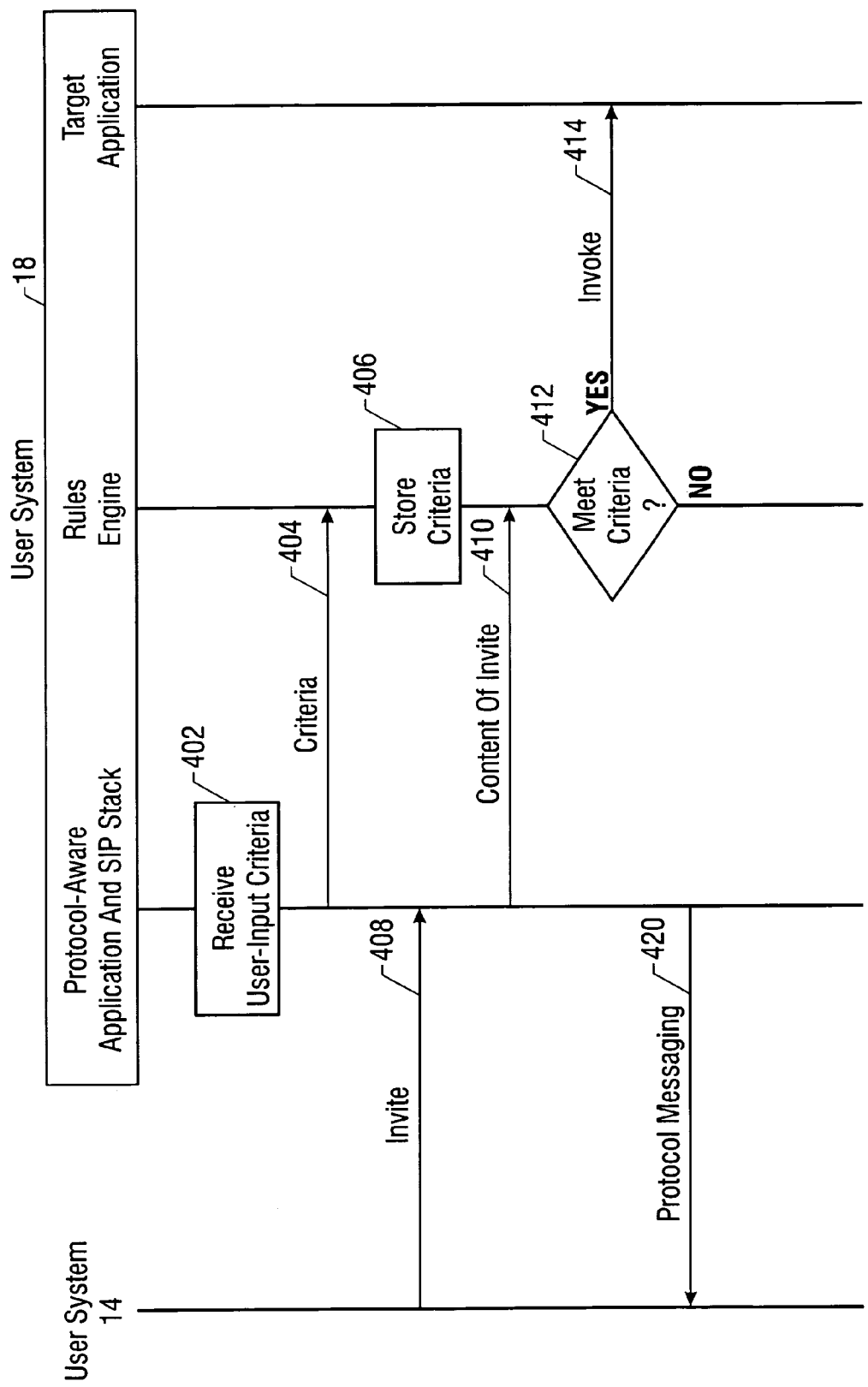
FIG. 8 is a message flow diagram illustrating a process in accordance with an embodiment.

Referring to FIG. 8, a process of launching an application routine (or other software routine or module) in response to an incoming Invite request is illustrated. In the called user system, which may be the user system 18, the protocol-aware application 106 (FIG. 2) receives (at 402) user-input criteria that have been entered through the call rules wizards 300, 301 and 330. The received criteria are communicated (at 404) to the rules engine 102, which stores the criteria (at 406). Communication of the criteria may be performed by calling various methods in the call rules object 132.

The protocol-aware application 106 and SIP stack 110 may next receive (at 408) a SIP Invite request from the user system 14. Upon receipt of the Invite request, the contents of the Invite request are passed by the protocol-aware application 106 to the rules engine 102. The SIP message may be passed in its entirety to the rules engine 102, or the protocol-aware application 106 may extract relevant portions from the SIP message to pass to the rules engine 102. The rules engine 102 then performs a comparison of the contents of the Invite request with the criteria set by the user (at 412). If a match occurs, then the rules engine sends a request to launch (at 414) the target application set in the call rules. If the criteria are not met, processing continues and the user system 18 waits for the next call request (either inbound or outbound). To complete the call processing, further protocol messaging may be exchanged between the user systems 14 and 18 (at 420).

Referring to FIG. 9, the code (in Java, for example) 500 for creating a call rules object 132 (callRule) is illustrated. The callRule object 132 includes various methods that may be called by the protocol-aware application 106 in response to user-entered information and selections in the GUI screens of FIGS. 3–6 as well as other inputs.

A match method (not shown) in the callRule object 132 is called by the protocol-aware application 106 in response to receipt of an Invite message. The match method directs the call rules engine 102 (which may be a function that is part of the object 132) to evaluate the incoming SIP message and the direction of the message (inbound or outbound). The match method compares the content of the Invite message and whether the Invite message is inbound or outbound with the content of the Invite message.

The first line 502 of the code 500 creates a new callRule object 132. A second line 504 calls a setMessageType method with the parameter SipBase.SIP_INVT to indicate that the object 132 is to act upon SIP Invite messages. In other call-Rule objects 132, other control messages may be acted upon. Lines 506 of the code makes several calls to an addHeaderConstraint method to set the following rules: priority is normal, the organization is "Nortel Networks," and the "From" field is "aprokop@nortelnetworks.com." In addition a setDirection method is also called to indicate that rules processing is to be performed on an "incoming" call request.

Line 508 calls a setUserDefined method to provide the user-defined data that is passed to the target application, and line 510 calls a setClassToInstantiate method to set the target application ("com.nortelnetworks.com.sippro.exampleApp") that is to be instantiated if the rules match is successful.

Other callRule objects 132 may be defined with different sets of rules and different target applications or other software routines to launch.

A method and apparatus has been described to enable the processing of messages that are used to establish communication sessions over a packet-based network by launching various software routines to perform desired tasks. An example software routine that may be launched includes a web browser that can display information about a calling or called party. A middle layer (e.g., call rules engine 102 in FIG. 2) may compare information in an inbound or outbound message with a set of predetermined rules or criteria. If a match is found, then the middle layer launches the appropriate one or more software routines. By having the ability to launch one or more routines in a system in response to a message such as a call request, interaction with various applications or other components that may be resident in the system is made available as part of a call session. Information may be displayed about a calling or called party. Predetermined information may be accessed. Other types of software routines may also be launched for enhanced flexibility and convenience in call sessions.

In addition to processing of SIP messages as discussed above, other types of messages may be processed for launching various software routines. For example, the messages may be according to each H.323. Alternatively, the messages may also be for establishing text-based chat sessions over the data network.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a user system capable of communicating over a network, comprising:
   receiving, in the user system, a control message for a call session over the network;
   receiving one or more predetermined criteria entered by a user through a user interface of the user system;
   comparing, by a rules engine executable in the user system, information in the control message against the one or more predetermined criteria; and
   loading a web page, in the user system, based on the comparison by the rules engine of information in the control message with the one or more predetermined criteria.

2. The method of claim 1, wherein loading the web page includes launching a web browser to perform a service separate from and in addition to call control and status and media-related tasks.

3. The method of claim 2, further comprising receiving, through the user interface, a name of a software routine corresponding to the web browser to be launched.

4. The method of claim 3, further comprising receiving user-defined data from the user interface, the user-defined data for passing to the launched web browser.

5. The method of claim 1, further comprising sending one or more messages in response to the control message to establish a call session.

6. The method of claim 1, wherein receiving the control message includes receiving a message according to a predetermined protocol for establishing a real-time audio-based interactive communications session.

7. The method of claim 1, wherein receiving the control message includes receiving a message for establishing a real-time text-based communications session.

8. The method of claim 1, wherein receiving the control message includes receiving a message according to a Session Initiation Protocol.

9. The method of claim 1, wherein receiving the control message is performed by a protocol-aware module and comparing the information is performed by a separate module.

10. The method of claim 1, wherein comparing the information in the control message includes comparing an identifier of a caller.

11. The method of claim 1, wherein comparing the information in the control message includes comparing an identifier of a callee.

12. The method of claim 1, wherein comparing the information in the control message includes comparing information selected from the group consisting of time, date, message subject, message priority, and message direction.

13. The method of claim 1, further comprising launching different ones of plural routines based on the comparison of the control message information with the one or more predetermined criteria.

14. The method of claim 1, wherein receiving the control message includes receiving a Session Initiation Protocol Invite request.

15. The method of claim 1, further comprising receiving a uniform resource locator (URL) through the user interface, wherein loading the web page includes opening the web page specified by the URL received through the user interface.

16. A user system comprising:
   a processor;
   a web browser executable on the processor;
   a user interface to receive a set of one or more user-defined rules;
   a network interface to receive a call request over a network;
   a protocol-aware module executable on the processor to process the call request; and
   a rules engine executable on the processor to compare information in the call request with the set of one or more user-defined rules, and to invoke the web browser based on comparing the information in the call request with the set of one or more user-defined rules.

17. The user system of claim 16, wherein the web browser performs a task that is separate from and in addition to call control, call status, and media-related services.

18. The user system of claim 16, wherein the user interface is adapted to receive a name of a software routine corresponding to the web browser to be invoked.

19. The user system of claim 18, wherein the user interface is further capable of receiving user-defined data to pass with the launching of the web browser.

20. The user system of claim 16, wherein the call request includes a Session Initiation Protocol Invite request.

21. The user system of claim 16, wherein the user interface is adapted to receive a uniform resource locator (URL), and wherein the web browser invoked based on the comparing is adapted to open a web page specified by the received URL.

22. The user system of claim 16, wherein the one or more user-defined rules are selected from the group consisting of time, date, message subject, message priority, and message direction.

23. An article including one or more storage media containing instructions for controlling a user device in a communications system having a network, the instructions when executed causing the user device to:

transmit a control message according to a predetermined protocol for establishing a call session over the network;

provide a user interface in the user device to receive one or more predetermined user-defined rules;

invoke a rules engine to compare information in the control message with one or more predetermined user-defined rules; and load a web page in response to comparing the information in the control message with the one or more predetermined user-defined rules.

24. The article of claim 23, wherein the predetermined protocol provides for real-time interactive communications sessions.

25. The article of claim 23, wherein the predetermined protocol provides for text-based chat sessions.

26. The article of claim 23, wherein the predetermined protocol includes a Session Initiation Protocol.

27. The article of claim 23, wherein the instructions when executed cause the user device to further receive a uniform resource locator (URL) through the user interface, wherein loading the web page includes opening a web page specified by the URL received through the user interface.

28. A data signal embodied in a carrier wave and comprising instructions for controlling a user device in a communications system, the instructions when executed causing the user device to:

receive a call request according to a first protocol;

provide a user interface to receive one or more user criteria;

perform a rules check of information in the call request by invoking a rules engine to compare information in the call request with the one or more user criteria; and launch a web browser based on the rules check performed by the rules engine.

29. The data signal of claim 28, wherein the instructions when executed cause the user device to further receive a uniform resource locator (URL) through the user interface, wherein launching the web browser includes opening a web page specified by the URL received through the user interface.

30. The data signal of claim 28, wherein the one or more user criteria are selected from the group consisting of time, date, message subject, message priority, and message direction.

31. A system comprising:

a plurality of software routines;

a storage device containing user-entered rules including a first set of rules and a second set of rules; and a network interface to receive one of an inbound and outbound message;

a rule engine to: compare information in the message with the user-entered rules;

launch a first software routine in response to the rules engine determining that the first set of rules is satisfied; and launch a second software routine in response to the rules engine determining that the second set of rules is satisfied.

32. A user system comprising:

a web browser;

a network interface to transmit a call request for establishing a call session over a network;

a user interface to receive user-entered rules;

a storage device to store the user-entered rules; and a rules engine adapted to compare information in the call request with the user-entered rules and to load a web page in the web browser in response to the comparing.

33. The user system of claim 32, wherein the user interface is adapted to receive a uniform resource locator (URL), and wherein the web page loaded in response to the comparing is specified by the received URL.

34. The user system of claim 32, wherein the user-entered rules are selected from the group consisting of time, date, message subject, message priority, and message direction.

* * * * *